United States Patent
Richards et al.

(10) Patent No.: US 9,423,552 B2
(45) Date of Patent: Aug. 23, 2016

(54) LIGHTGUIDE DEVICE WITH OUTCOUPLING STRUCTURES

(71) Applicant: Google Inc., Mountain View, CA (US)

(72) Inventors: Evan M. Richards, Santa Clara, CA (US); Anurag Gupta, San Jose, CA (US); Ozan Cakmakci, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 221 days.

(21) Appl. No.: 14/188,411

(22) Filed: Feb. 24, 2014

(65) Prior Publication Data

US 2015/0241619 A1   Aug. 27, 2015

(51) Int. Cl.
| | |
|---|---|
| F21V 7/04 | (2006.01) |
| F21V 8/00 | (2006.01) |
| G02B 27/01 | (2006.01) |
| G02B 27/00 | (2006.01) |
| G02B 5/09 | (2006.01) |
| G02B 27/10 | (2006.01) |
| G02B 27/14 | (2006.01) |

(52) U.S. Cl.
CPC ............. *G02B 6/0045* (2013.01); *G02B 5/09* (2013.01); *G02B 6/0015* (2013.01); *G02B 6/0035* (2013.01); *G02B 6/0065* (2013.01); *G02B 27/0081* (2013.01); *G02B 27/0172* (2013.01); *G02B 27/1073* (2013.01); *G02B 27/141* (2013.01); *Y10T 29/49885* (2015.01)

(58) Field of Classification Search
CPC  G02B 6/0045; G02B 6/0035; G02B 6/0015; G02B 27/0172; G02B 6/0065; G02B 27/0081; G02B 5/09; G02B 27/1073; G02B 27/141; Y10T 29/49885
USPC ............... 362/601, 606, 607, 616, 627, 628
See application file for complete search history.

(56) References Cited

U.S. PATENT DOCUMENTS

| | | |
|---|---|---|
| 6,113,801 A | 9/2000 | Savant et al. |
| 6,256,447 B1 | 7/2001 | Laine |
| 6,883,924 B2 | 4/2005 | Maeda et al. |
| 8,064,138 B2 | 11/2011 | Taira et al. |
| 8,111,446 B2 | 2/2012 | Gally et al. |
| 8,373,821 B2 | 2/2013 | Sampsell et al. |
| 8,402,647 B2 * | 3/2013 | Chui ................... G02B 6/0036 29/428 |
| 8,665,178 B1 * | 3/2014 | Wang ................. G02B 27/0172 345/7 |
| 2002/0080598 A1 * | 6/2002 | Parker ................. G02B 6/0021 362/616 |
| 2010/0309687 A1 * | 12/2010 | Sampsell ............ G02B 26/001 362/627 |

* cited by examiner

*Primary Examiner* — Anh Mai
*Assistant Examiner* — Glenn Zimmerman
(74) *Attorney, Agent, or Firm* — Blakely Sokoloff Taylor & Zafman LLP

(57) ABSTRACT

A lightguide assembly including structures to provide for outcoupling of light from an internal reflection structure. In an embodiment, a lightguide assembly includes light transmissive bodies forming respective corrugations which are coupled to one another. Optical coatings are variously disposed between the respective corrugations, wherein the optical coatings provide for redirection of light from the lightguide assembly. In another embodiment, optical coatings are each applied to a respective one of alternate facets of a corrugation. Polymer film portions provide mechanical support for the optical coatings during application to the corrugation.

13 Claims, 9 Drawing Sheets

LIGHTGUIDE DEVICE WITH OUTCOUPLING STRUCTURES

BACKGROUND

1. Technical Field

This disclosure relates generally to the field of optics, and in particular but not exclusively, relates to near-to-eye optical systems.

2. Background Art

A head mountable display ("HMD") is a display device configured to be worn on or about a user's head. HMDs usually incorporate some sort of near-to-eye optical system to display an image within a few centimeters of the user's eye. Single eye displays are referred to as monocular HMDs while dual eye displays are referred to as binocular HMDs. Some HMDs display only a computer generated image ("CGI"), while other types of HMDs are capable of superimposing CGI over a real-world view. The former type of HMD is often referred to as virtual reality while latter type of HMD is often referred to as augmented reality because the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves.

Near eye displays often rely on internal reflection properties of an optical transmission medium. Redirection of light from transmission from an internal reflection structure often depends upon some type of outcoupling structure such as a diffraction grating. As the quality of near eye display technologies continues to improve, the appearance and behavior of such outcoupling structures becomes increasingly important with respect to overall user experience.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments of an apparatus, system and method to provide a lightguide assembly are described herein. The lightguide assembly may comprise a structure, referred to herein as a "body," which includes a light transmissive material that forms a surface corrugation. Such a corrugation may include portions, referred to herein as "facets," which each face toward a respective direction along a length of the corrugation. For example, a first plurality of facets of a corrugation may each face toward a first direction, where a second plurality of other facets of the corrugation (e.g. alternating with the first plurality of facets) may each face toward an opposite direction. In an embodiment, such a corrugation may follow along a flat plane—e.g. where peaks (or valleys) of the corrugation are aligned with one another along a straight line. Alternatively, such a corrugation may follow a curved plane. Individual facets of such a corrugation may each be flat or curved, according to different embodiments.

A lightguide assembly according to one embodiment may include two such bodies bonded or otherwise coupled to one another to form one or more outcoupling structures. Coatings may be variously disposed between respective corrugations of the bodies, wherein the coatings provide for redirection of light from the lightguide assembly. The coatings may be disposed only on a subset of facets of a corrugation of a first body. For example, optical coating material may be disposed on only alternate facets of a first corrugation. Certain embodiments provide for precise control of the location and/or thickness of a coating material to be variously applied to corrugation facets.

Figure 1A:
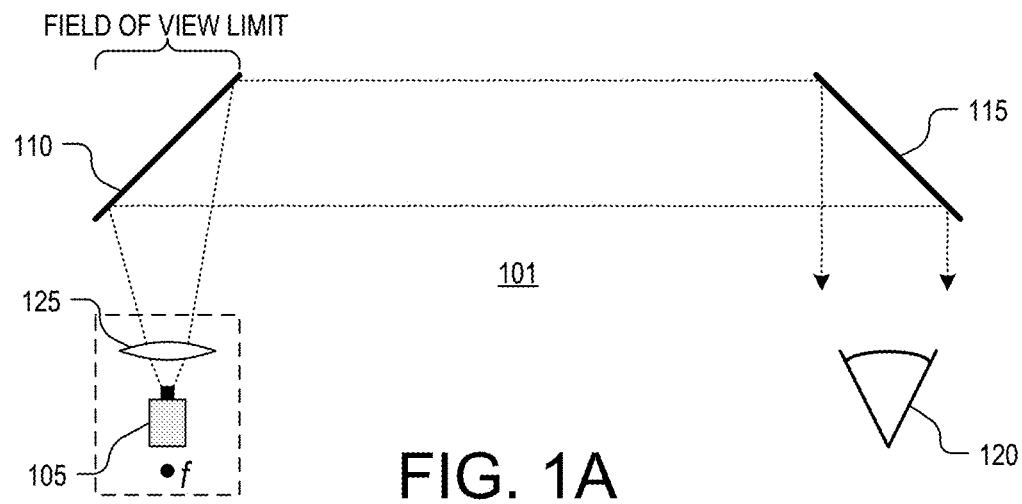
FIG. 1A illustrates a first near-to-eye optical system using an input lens and two mirrors.

FIG. 1A illustrates a near-to-eye optical system 101 using an input lens and two mirrors according to one embodiment. An image source 105 outputs an image that is reflected by in-coupling mirror 110 and out-coupling mirror 115, which form an image near to eye 120. Image source 105 is typically mounted above the head or to the side of the head, while mirrors 110 and 115 bend the image around the front of the viewer's face to their eye 120. Since the human eye is typically incapable of focusing on objects placed within a few centimeters (e.g. less than 25 cm, in some cases), this system requires a lens 125 interposed between the first mirror 110 and image source 105. Lens 125 creates a virtual image that is displaced further back from the eye than the actual location of mirror 115 by positioning image source 105 inside of the focal point f of lens 125. Lens 125 may further collimate, at least partially, light from image source 105, where resulting collimated or near collimated light is reflected by mirror 110 toward mirror 115 and eye 120. Optical system 101 suffers from a relatively small field of view (e.g., approximately 20 degrees) limited by the extent of mirrors 110 and 115 and the bulkiness of lens 125. The field of view can be marginally improved by placing mirrors 110 and 115 within a high index material (not shown) to compress the angles of incidence, but is still very limited and the thickness of the lightguide rapidly increases to achieve larger fields of view. Therefore, optical system 101 is sensitive to conditions which may further degrade the display of an image to eye 120.

Figure 1B:
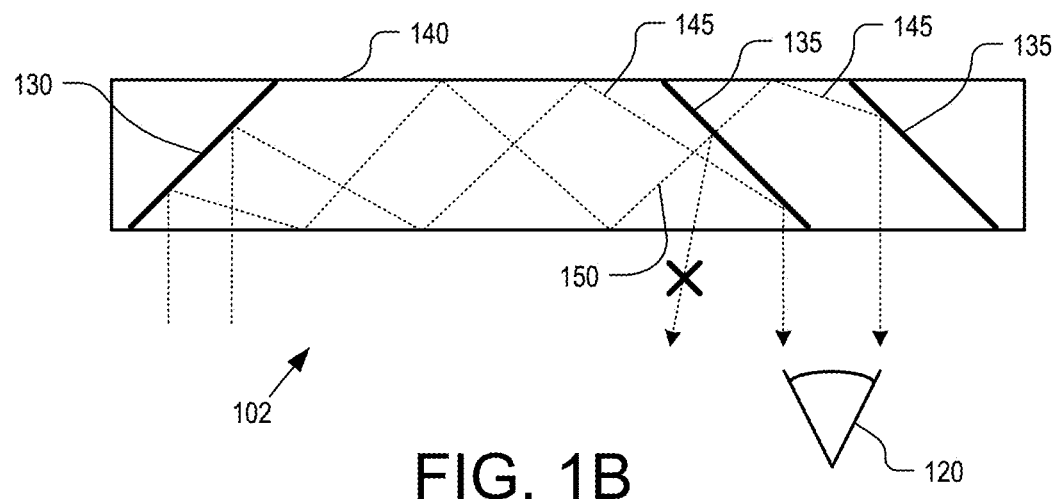
FIG. 1B illustrates a second near-to-eye optical system using angle sensitive dichroic mirrors.

FIG. 1B illustrates a second near-to-eye optical system 102 using angle sensitive dichroic mirrors according to an embodiment of the disclosure. Optical system 102 includes a single in-coupling mirror 130 and two out-coupling dichroic mirrors 135 disposed within a lightguide 140. This system uses collimated input light from virtual images placed at infinity. In order to produce a useful image at eye 120, each incident angle of input light should correspond to a single output angle of emitted light. Since light can potentially reflect off of output mirrors 135 on either a downward trajectory (ray segments 145) or an upward trajectory (ray segments 150), each input angle can potentially result in multiple output angles, thereby destroying the output image. To overcome this problem, optical system 102 uses angle sensitive dichroic mirrors 135 that pass light with incident sufficiently close to normal while reflecting light having a sufficiently oblique incidence. However, the nature of dichroic mirrors 135—i.e. that they pass some incident angles while reflecting others—limits the field of view optical system 102 and the dichroic mirror coating does not provide sharp angular cutoffs, resulting in ghosting effects.

Figure 1C:
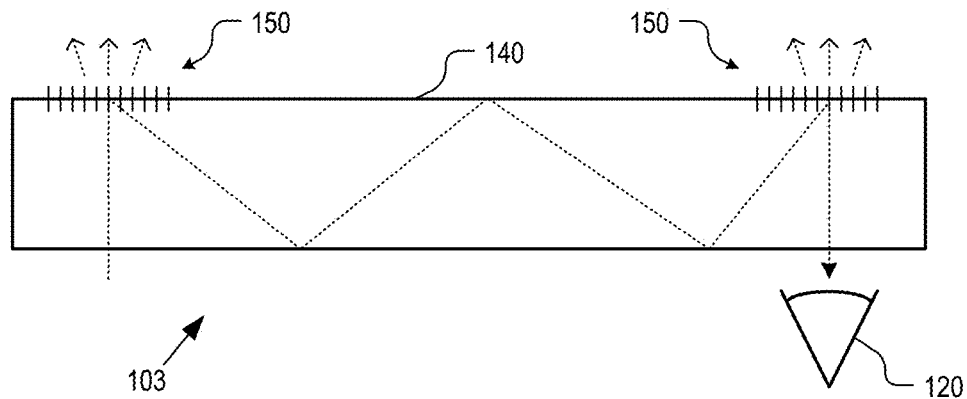
FIG. 1C illustrates a third near-to-eye optical system using holographic diffraction gratings.

FIG. 1C illustrates a third near-to-eye optical system 103 using diffraction gratings. Optical system 103 is similar to optical system 102, but uses diffraction gratings 150 in place of mirrors 130 and 135. Diffraction gratings 150 are inefficient reflectors, since the input and output diffraction gratings must be precisely tuned to one another, or else the output image will suffer from color separation. Achieving a sufficient match between the input and output gratings 150 requires extreme control over manufacturing tolerances, which is often difficult and costly. Again, optical system 103 suffers from a limited field of view. For at least the foregoing reasons, optical systems 101, 102, 103 may be variously sensitive to conditions which cause further degradation to image display from a lightguide such as lightguide 140.

Figure 2:
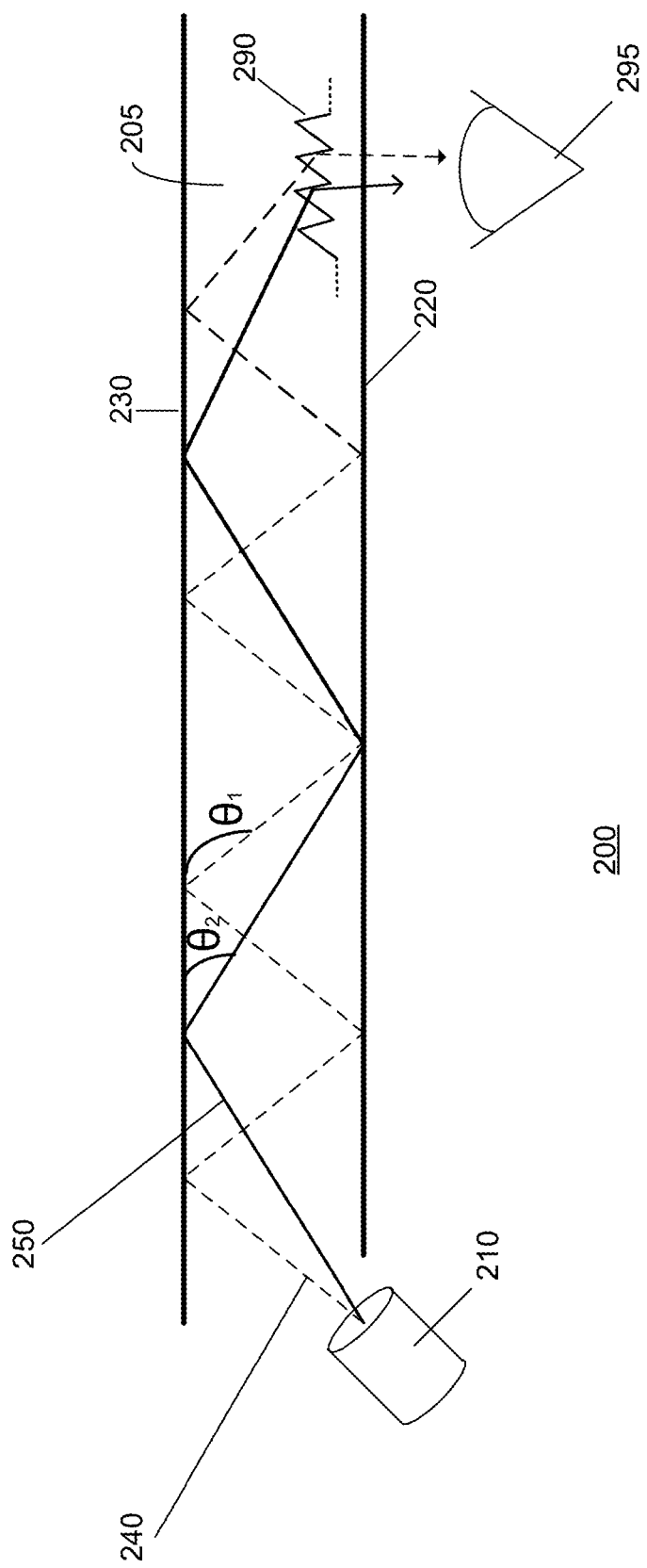
FIG. 2 illustrates elements of a lightguide assembly according to an embodiment.

FIG. 2 illustrates a lightguide in accordance with an embodiment of the disclosure. The illustrated embodiment is a cross-sectional view on an image lightguide for generating a near-to-eye image. Lightguide 200 receives light from light source 210, which is propagated through the lightguide 200 via surfaces 220 and 230. Said reflective surfaces enclose lightguide core 205, which may comprise air, glass, quartz, plastic, or any other optically transparent material. Lightguide 200 may be a multi-component lightguide structure that is assembled from component bodies which, for example, have been injection molded, cut or otherwise formed to include corrugated surface portions.

In this illustration, light beam path 240 is shown to enter lightguide 200 and strike surface 230 with a sufficiently oblique angle, $\theta_1$, such that the image is guided via internal reflection ("IR") within the waveguide. IR occurs when light travels within a medium with a higher refractive index surrounded by a lower refractive index (e.g., from glass to air). Snell's law determines an angle of total internal reflection at surface 230, which in turn determines, in part, an output angle for light which is outcoupled from lightguide 200.

When light is coupled into lightguide 200 using light beam path 240 to utilize TIR, if the light is not assertively coupled out of the lightguide it continues propagating along the waveguide. One technique for emitting guided light from lightguide 200 is to include out-coupling region 290 that permits the light to exit; however, the emission angle of light 240 from out-coupling region 290 may not be desirable for coupling into a user eye 295 when lightguide 200 is used in connection with a head mountable display. If light 240 is coupled into lightguide 200 at the steepest angle (angle $\theta_1$) permitted by TIR, then the number of side to side reflections for light 240 to reach out-coupling region 290 is increased. Alternatively, light beam path 240 may be described to have a small "angle of incidence"—i.e., the angular difference from normal, is small. Due to practical limitations in fabrication and composition, each reflection has an associated loss which may arise from finite extinction coefficients, material absorption or scatter effects at the media interface. Accordingly, if a shallower angle (angle $\theta_2$) is used, such as with light 250, then light 250 reaches out-coupling region 290 with fewer reflections and less power loss; however, the emission angle associated with light 250 may not be desirable.

In one embodiment, surfaces 220 and 230 are disposed in parallel and comprise a reflective layer, such that—due to an alternate type of internal reflection provided with the reflective layer—IR is not required to propagate light through the waveguide. As shown in the illustrated embodiment, because light 250 enters the lightguide at a shallower angle than light beam path 240, it reaches out-coupling region 290 with less reflections off of surfaces 220 and 230. Furthermore, because IR is not being utilized, it is to be understood that angle $\theta_2$ is not restricted to any value range, as long as it reflects off of surfaces 220 and 230 and reaches out-coupling region 290. Out-coupling region may be an optically transmissive region that allows light 250 to leave lightguide 200.

In an embodiment, lightguide 200 may be used in a single eye display (i.e., a monocular HMD) or a dual eye display (i.e., a binocular HMDs). Lightguide 200 may be used to display only a CGI (i.e., a virtual reality (VR) system) wherein at least reflective surface 230 is fabricated with a non-optically transmissive material—e.g., a reflective metal film, such as, aluminum, silver, nickel, gold, chromium, tin, or otherwise. In one embodiment, reflective surfaces 220 and 230 are fabricated using a dichroic film, which enables wavelength selectivity for specific transmission and reflection behavior.

Lightguide 200 may also be used in an HMD capable of superimposing CGI over a real-world view (i.e., an augmented reality (AR) system) where the user's image of the world is augmented with an overlaying CGI, also referred to as a heads-up display (HUD). For HUDs, both reflective surfaces 220 and 230 are partially transparent and partially reflective.

In embodiments where lightguide 200 is fabricated with an optically transmissive, light guiding material, a wire-grid polarizer may be used. A wire-grid polarizer includes an array of wires placed in a plane. Electromagnetic waves which have a polarization component of their electric fields aligned parallel to the wires induce the movement of electrons along the length of the wires and reflect this component of the incident light. The polarization component that is perpendicular to the wires passes through the wire-grid polarizer substantially unaffected. Thus, a wire-grid polarizer permits some ambient external light to pass through lightguide 200 into eye 295 of a user, while allowing the CGI to augment a real-world view to produce AR.

Figure 3:
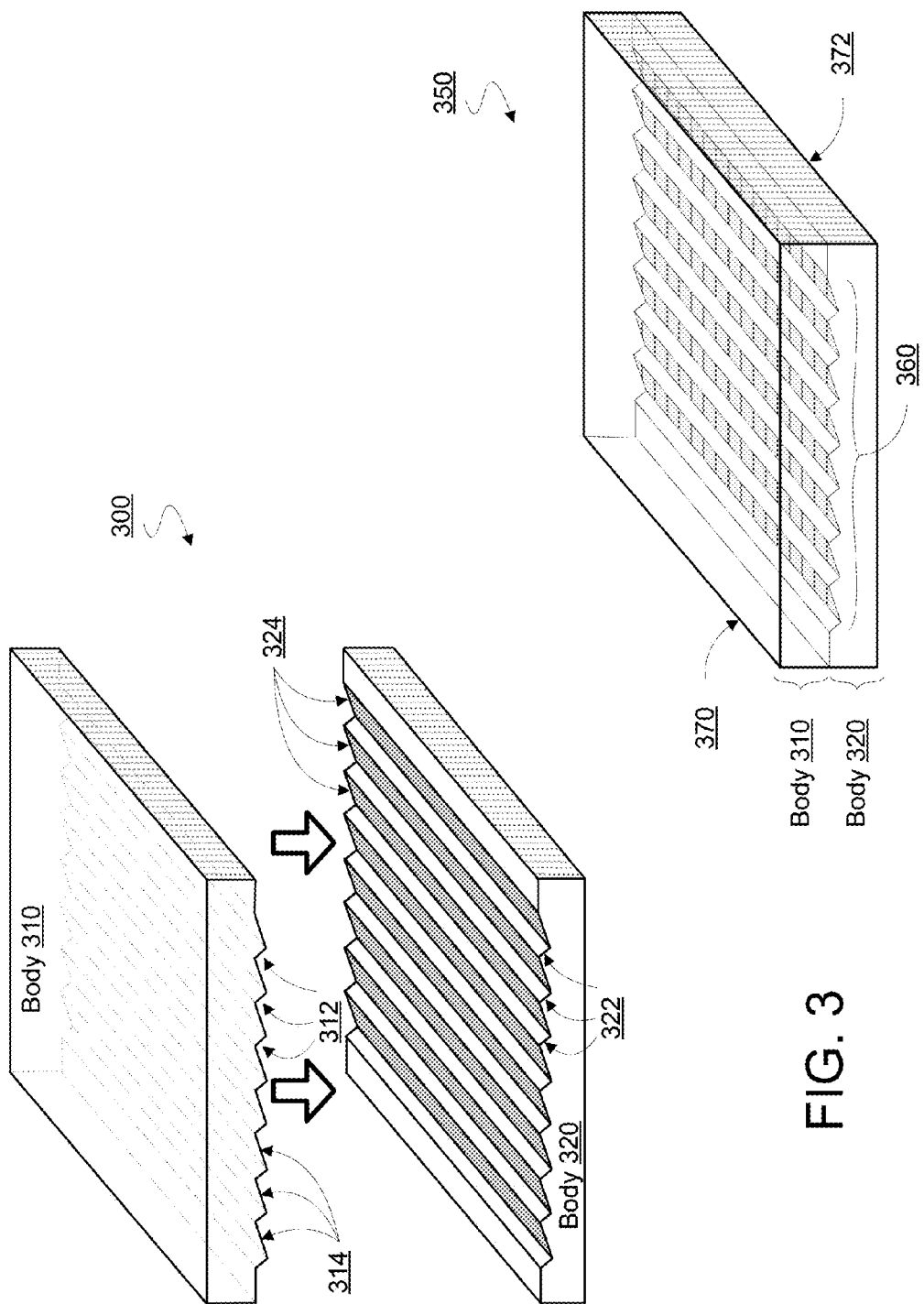
FIG. 3 illustrates elements of a lightguide assembly according to an embodiment.

FIG. 3 illustrates elements of a lightguide assembly (also referred to as a waveguide assembly) to provide outcoupling structures for an image display according to an embodiment. In FIG. 3, an assembly stage 300 is shown wherein a body 310 and a body 320 are bonded or otherwise coupled to one another to form at least in part a lightguide assembly 350. Bodies 310, 320 may each include a respective light transmissive material which, for example, comprises glass, quartz, plastic or any of a variety of other materials such as those adapted from conventional optics technologies. A light transmissive material of body 310 may, for example, be the same as, or otherwise have an index of refraction substantially equal to that of, a light transmissive material of body 320.

The light tranmissive material of body 320 may form at least in part a surface of body 320 which includes a corrugation. By way of illustration and not limitation, a corrugated portion of a surface of body 320 may comprise a plurality of facets 324 which each face a first direction along a length of the corrugation. Another plurality of facets 322 of the corrugation formed by body 320 may alternate with the plurality of facets 324 along the length of the corrugation. In an embodiment, some or all of plurality of facets 322 adjoin each of a respective pair of the plurality of facets 324. Similarly, a surface of body 310 may form a corrugation which comprises a plurality of facets 312 and, in some embodiments, further comprises a plurality of facets 314 which alternate with the plurality of facets 312 along the length of the corrugation of body 310.

Assembly stage 300 may comprise coupling—e.g. including adhereing or otherwise bonding—bodies 310, 320 to one another, wherein the respective corrugations of bodies 310, 320 are aligned with one another. A portion of the respective corrugations may be in direct contact with one another, although certain embodiments are not limited in this regard. Prior to the coupling of bodies 310, 320 a plurality of facets of one of the corrugations may each have disposed thereon a respective coating. Such coatings may be selectively applied to only some facets of the corrugation—e.g. wherein a coating material is disposed only across facets of the corrugation which face one direction (rather than an opposite direction) along a length of the corrugation. It is to be understood that coatings, as referred to herein, are to be distinguished from one another where such coatings are not contiguous with one another.

By way of illustration and not limitation, some or all of the plurality of facets 324 may each have an optical coating material or materials disposed thereon—e.g. as a thin film—where the same optical coating material or materials is not disposed across some or all of the plurality of facets 322. Such an optical coating material may have one or more optical characteristics (refraction, transmission, absorption, polarization and/or the like) which differ from one or more corresponding optical characteristics of a light transmissive material of bodies 310, 320. The selective application of such optical coatings to only some facets of a corrugation of bodies 310, 320 may provide for the coupled corrugations to serve as an outcoupling interface 360 for directing light from the lightguide assembly 350. For example, subsequent operation of the optical device may include a directing of light within the lightguide assembly 350 for internal reflection of such light between sides 370, 372 of the lightguide assembly 350. At some point, such light may be transmitted to a region of lightguide assembly 350—such as that region represented in FIG. 3—which includes outcoupling interface 360. Optical coatings variously disposed along the length of outcoupling interface 360 may cause the light to be reflected, refracted or otherwise redirected to exit lightguide assembly 350.

As compared to FIG. 1B, for example, the embodiment illustrated in FIG. 3 may allow for simpler fabrication and/or a reduction in image artifacts. For example, in optical system 102 of FIG. 1B mirrors 130, 135 delineate three different portions of lightguide 140. By contrast, bodies 310, 320 of lightguide assembly 350 are fewer in number than these three different portions of lightguide 140. Moreover, mirrors 130, 135 intersect the outer surfaces of the lightguide 102, which tends to cause image artifacts due to chipping or other manufacturing (or post-manufacturing) defects at such outer surfaces. The likelihood of such visual artifacts may be limited according to certain embodiments by locating facet surfaces entirely internal to a lightguide. The occurrence of such artifacts may be further reduced by selectively applying coating materials to only facet structures (or only portions thereof) which have been identified as being comparatively low in surface defects—e.g. as compared to some threshold amount and/or to the amount of defects in other facet portion(s).

Figure 4A:
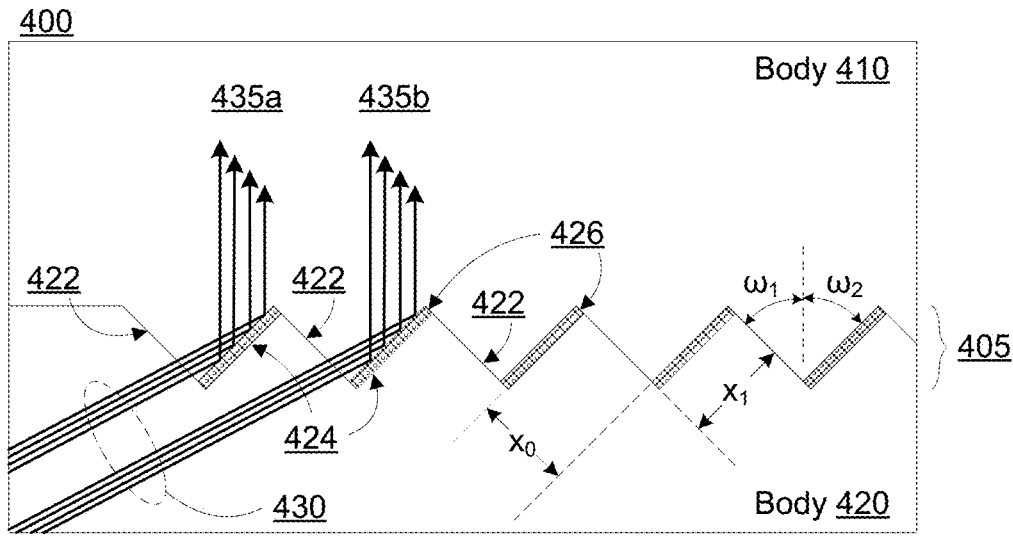
FIGS. 4A, 4B are cross-sectional views illustrating elements each of a respective lightguide assembly according to a corresponding embodiment.

FIG. 4A is a cross-sectional view 400 of a lightguide assembly for directing light according to an embodiment. The lightguide assembly represented in view 400 may include some or all of the features of lightguide assembly 350, for example.

As shown in view 400, a lightguide assembly may include bodies 410, 420 bonded or otherwise coupled to one another to form an outcoupling interface 405. In an embodiment, body 420 (or body 410) may serve as one of multiple layers of at least some portion of the lightguide assembly. For example, body 420 may be substantially half of the entire lightguide assembly, wherein body 420 extends across all of the lightguide assembly and/or forms all of one exterior surface of the lightguide assembly. Alternatively, body 420 (or body 410) may extend across only a portion of the length and/or width of the lightguide assembly—e.g. in addition to extending only partially along the depth of the lightguide assembly shown in view 400. For example, body 420 may be positioned within a recess formed by body 410.

Body 410 may include a first light transmissive material which forms a corrugated portion of a surface of body 410. Similarly, a second light transmissive material of body 420 may form another surface corrugation. The respective corrugations of bodies 410, 420 may be aligned with one another along outcoupling interface 405. By way of illustration and not limitation, a surface of body 420 may include a corrugation comprising a first plurality of facets 424 which face toward one direction along the length of interface 405. The same corrugation formed by body 420 may further comprise a second plurality of facets 422 which face toward the opposite direction along the length of interface 405, wherein the plurality of facets 422 alternate with the plurality of facets 424.

Coatings may be variously disposed between respective facets of such corrugations. For example, an optical coating material may be disposed across only certain facets (but not others) of a corrugation formed by body 420. By way of illustration and not limitation, coatings 426 may be variously disposed on the corrugated surface of body 420 (or alternatively, on the corrugated surface of body 410) with sputtering, evaporation or any of various other techniques which, for example, include operations adapted from conventional thin film coating techniques. Alternatively, coatings 426 may be adhered or otherwise bonded each to a respective one of facets 424. Such adhering may be provided by an optical adhesive material (not shown) which, for example, has an index of refraction which is substantially equal to (e.g. within 5% of) an index of refraction of a light transmissive material of bodies 410, 420. The optical adhesive material may be cured in response to pressure, ultraviolet (or other) light or heat, for example. Such an optical adhesive may include, but is not limited to, any of a variety of liquid optically clear adhesives and/or non-liquid optically clear adhesive tapes known generally in conventional optics technologies.

Coatings 426 may provide for outcoupling of light from the lightguide assembly. For example, operation of an optical device may include directing light 430 for internal reflection between exterior surfaces (not shown) of the lightguide assembly. Light 430 may eventually reach interface 405 at an angle which allows for transmission of light 430 through surfaces 422. However, given such an angle, an optical characteristic (e.g. including an index of refraction) of coatings 426 may result in portions 435a, 435b of light 430 being redirected for transmission out of the lightguide assembly.

Coatings 426 may each include a dielectric or other optical coating material which, for example, exhibits anti-reflective properties. Such an optical coating material may include, but is not limited to, magnesium fluoride, calcium fluoride and/or any of various metal oxides such as silicon dioxide, tantalum pentoxide, or zirconium dioxide and/or the like. In an embodiment, a series of dielectric materials (e.g. of different thicknesses) may be disposed on a facet to provide for particular optical response characteristics over a range of light angles, polarization, frequency and/or the like. An optical coating material of coatings 426 may be formed as a thin film—e.g. where the optical coating material has a total thickness of less than 20 microns. The optical coating material and/or the thickness thereof may accommodate reflection of light having a particular wavelength (or wavelength range) and/or polarization, for example.

Any of a variety of injection molding, cutting, polishing and/or other processing may be performed to form facets 422, 424 of body 420 (and/or corresponding corrugation structures of body 410). Such processing may be adapted from conventional optics techniques, which are not detailed herein and are not limiting on certain embodiments. In the illustrative embodiment, of FIG. 4A, facets 424 and facets 422 form a symmetric sawtooth pattern wherein a span $x_0$ of individual facets 422 is equal to a corresponding span $x_1$ of individual facets 424. Alternatively or in addition, an angle $\omega_1$ of the facets 422 (e.g. 45°) may be equal to an angle $\omega_2$ of the facets 424, where angles $\omega_1$, $\omega_2$ are measured with respect to a line is normal to a reference plane. Such a reference plane may include, for example, an exterior surface (not shown) of body 410, an exterior surface (not shown) of body 420 or a plane over which (or through which) interface 405 extends. One or both of $x_0$ and $x_1$ may be a value which, in one embodiment, is above a diffraction regime for visible light—e.g. where such physical dimensions of corrugation structures are for an angle of diffracted light to be below a level of resolution of the human eye (e.g. less than 1 arcminute). For example, $x_0$ and/or $x_1$ may be within a range of 0.5 mm to 5 mm, although certain embodiments are not limited in this regard. Additionally or alternatively, facets 422, 424 may extend along a width dimension of the lightguide assembly—orthogonal to the cross-section represented by view 400—for a greater length. For example, facets 422, 424 may be on the order of 5 mm to 15 mm long. However, such dimensions are merely illustrative of certain embodiments, and may vary according to implementation specific details.

Although certain embodiments are not limited in this regard, a light transmissive material of bodies 410, 420 may include an optical thermoplastic polymer such as any of various cyclic olefin copolymers. For example, one or both of bodies 410, 420 may comprise a high transparency polymer material such as Zeonex® or Zeonor® from Zeon Chemicals of Louisville, Ky. However, the particular type of light transmissive material(s) used may vary according to implementation-specific details.

In an embodiment, some or all of coatings 426 each include—e.g. in addition to an optical coating material—a film which, for example, provides mechanical support for the optical coating material during application onto one of facets 424. Although certain embodiments are not limited in this regard, a polymer film may provide such mechanical support, for example. In an embodiment, an index of refraction of the polymer film may be substantially equal to the index of refraction of a light transmissive material of bodies 410, 420. Although certain embodiments are not limited in this regard, such a polymer film may be comprised of an optical thermoplastic polymer such as such as Zeonex® or Zeonor®, for example. Such copolymers may be amenable to formation into thin sheets—for example, having a thickness at to below 200 microns—which are flexible and/or readily diced. Such copolymers may also provide good adhesion for processing to apply an optical material to a light transmissive substrate. As discussed herein, a polymer coating may serve as a handling mechanism for moving an optical coating material from a transfer sheet to a structure such as one of bodies 410, 420.

Figure 4B:
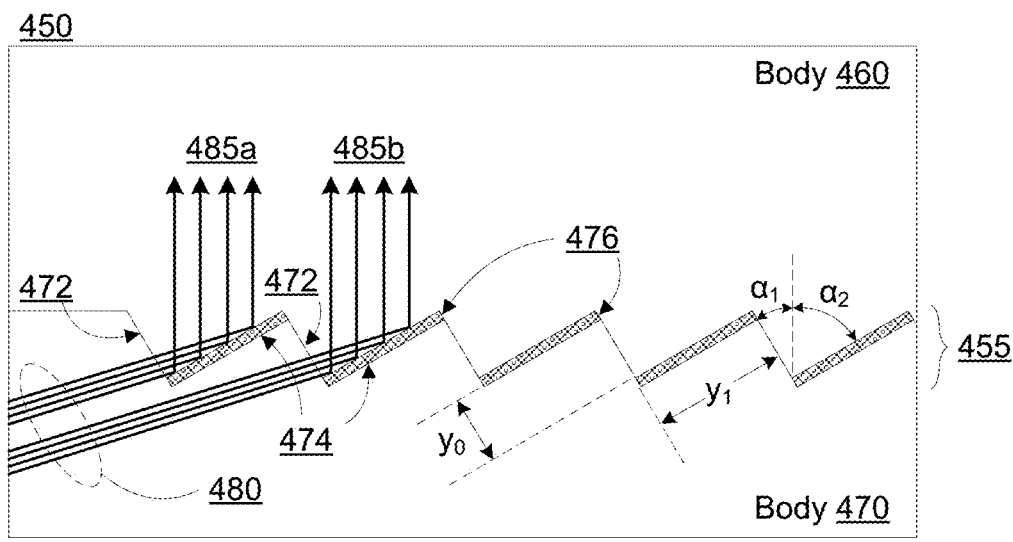

FIG. 4B is a cross-sectional view 450 of another lightguide assembly for directing light according to an embodiment. The lightguide assembly represented in view 450 may include some or all of the features of lightguide assembly 350, for example. The lightguide assembly shown in view 450 includes bodies 460, 470 coupled to one another to form an outcoupling interface 455. Bodies 460, 470 may each include respective light transmissive materials which form corrugations at interface 455. Such corrugations may comprise respective facets—e.g. where coatings are variously disposed each between respective pairs of such facets of the corrugations.

For example, a corrugation of body 470 may include a first plurality of facets 474 and a second plurality of facets 472 which alternate with the first plurality of facets 474 along a length of the corrugation. Portions of the corrugation—e.g. only facets 474—may have coatings 476 variously disposed thereon. Coatings 476 may include some or all of the features of coatings 426. Coatings 476 may provide for outcoupling of light from the lightguide assembly represented in view 450. For example, light 480 internally reflected within the lightguide assembly may eventually reach interface 455 at an angle which allows for transmission of light through surfaces 472. However, at that angle, an optical characteristic (e.g. including an index of refraction) of coatings 476 may cause portions 485a, 485b of light 480 to be redirected for transmission out of the lightguide assembly.

As contrasted with view 400, for example, facets 472, 474 form an asymmetric sawtooth pattern wherein a span y0 of individual facets 472 is different than a corresponding span y1 of individual facets 474. Alternatively or in addition, an angle $\alpha 1$ of the facets 472 may different than an angle $\alpha 2$ of the facets 474. One or both of y0 and y1 may be a value which, in one embodiment, is above a diffraction regime for visible light. For example, y0 and/or y1 may be within a range of 0.5 mm to 5 mm, although certain embodiments are not limited in this regard.

Figure 5:
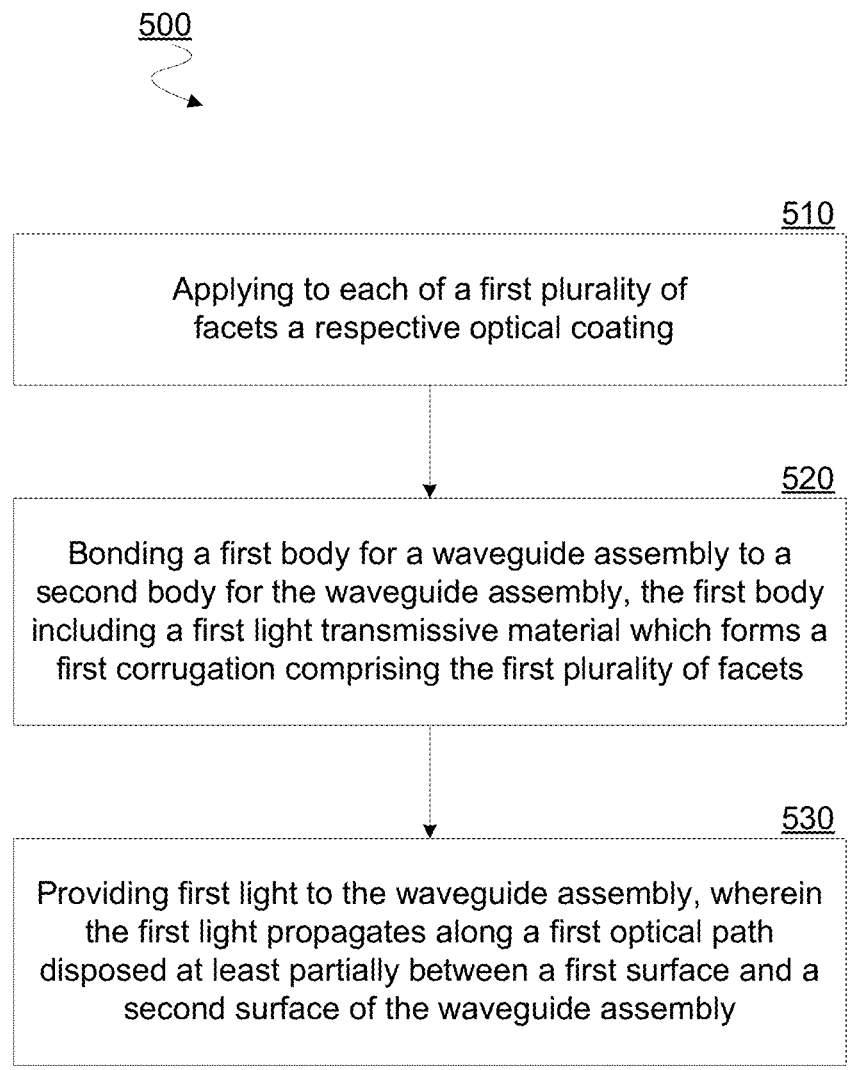
FIG. 5 is a flow diagram illustrating elements of a method for providing an optical device according to an embodiment.

FIG. 5 illustrates elements of a method 500 for providing an optical device according to an embodiment. Method 500 may be performed to fabricate, for example, lightguide assembly 350 or one of the lightguide assemblies represented in views 400, 450. Features of method 500 are discussed herein with reference to FIGS. 6 through 8, which show respective stages of processing to variously assembly or otherwise fabricate of an optical device. However, such discussion may be extended to additionally or alternatively apply to the assembly of any of a variety of other optical devices, according to different embodiments.

Figure 6:
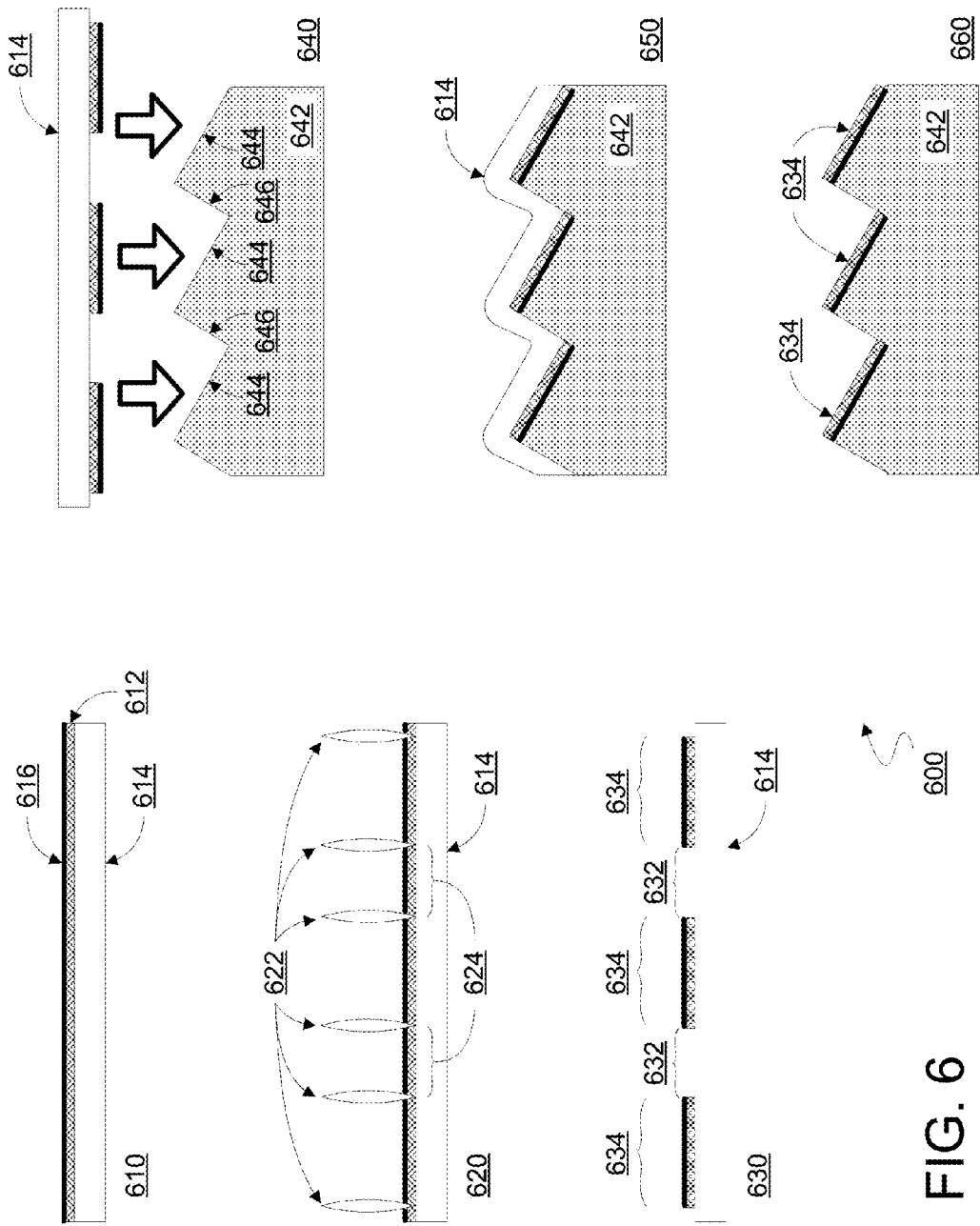
FIG. 6 illustrates elements of a process for fabricating a lightguide assembly according to an embodiment.

In an embodiment, method 500 includes, at 510, applying to each of a first plurality of facets a respective optical coating. FIG. 6 illustrates features of a process 600 according to one embodiment to implement the applying at 510. Process 600 includes a stage 610 wherein a polymer film 612 and an optical coating material 616 are disposed on a transfer sheet 614. For example, polymer film 612 may be applied by sputtering or evaporative coating onto transfer sheet 614, and optical coating material 616 may be similarly applied onto an exposed side of polymer film 612. In an embodiment, transfer sheet 614 is comprised of a plastic or other material which has enough adhesion to hold the polymer film 612 during deposition but not so much adhesion that the transfer sheet 614 cannot be removed once application of the polymer film 612 and optical coating material 616 are bonded or otherwise coupled to corrugation structures. Transfer sheet 614 may be for a single application of coating material(s) to a single region (say~10 mm×20 mm) of a body. Alternatively, transfer sheet 614 may be much larger—e.g. for a volume application of coating materials on multiple bodies. Various commercially-available polymer coatings—e.g. Zeonor® ZF14 or Zeonor® ZF16 from Zeon Chemicals—have applied on a least one side a protective film which may be adapted to serve as transfer sheet 614. These polymer films (with protective backing films) may be procured in individual sheets or in rolls.

At stage 620, a dicer 622 may cut away portions 624 of the polymer film 612 and optical coating material 616. As shown in stage 630, portions 624 may be removed to exposed areas 632 of the transfer sheet 614. The resulting transfer sheet assembly at stage 630 includes exposed areas 632 between laminates 634 which are variously comprised of optical coating material and polymer. Alternatively, dicer 622 may simply cut through polymer film 612, optical coating material 616 and transfer sheet 614 to form multiple, smaller transfer sheet assemblies.

At stage 640, the transfer sheet assembly of stage 630 may be transferred to a corrugated surface of a body 642 which includes both facets 644 and facets 646 which alternate with facets 644. Body 642 may include some or all of the features of one of bodies 320, 420, 470, for example. Laminates 634 may be aligned each to be applied onto a respective one of facets 644. Such application of laminates 634 may be with an optical adhesive which, for example, is index matched with an index of refraction of body 642 (and/or with an index of refraction of the polymer film 612). As illustrated in stage 650, the transfer sheet 614 may be comprised of a plastic or other flexile material which conforms to the corrugated surface of body 642. A pressure, UV or other curing process may be performed to complete the adhering of laminates 634 each to a respective one of facets 644. As shown in stage 660, the transfer sheet 614 may be subsequently removed to expose laminates 634 and/or facets 646.

Figure 7:
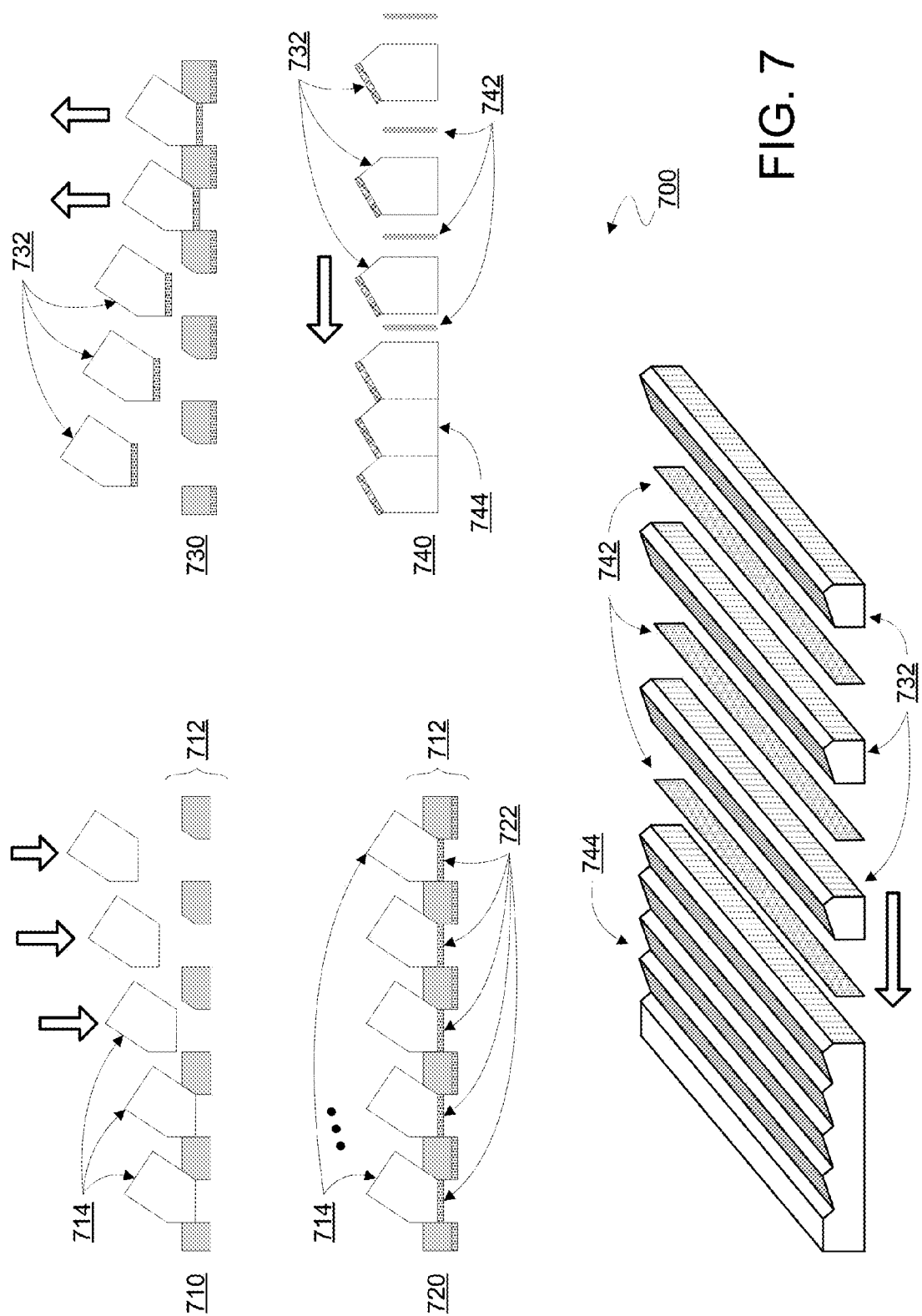
FIG. 7 illustrates elements of a process for fabricating a lightguide assembly according to an embodiment.

FIG. 7 illustrates features of a process 700 according to another embodiment to implement the applying at 510. Process 700 includes a stage 710 wherein component blocks 714 are each positioned with a mounting frame 712. The component blocks 722 may each include one or more sides which are each to subsequently form a respective facet of a body 744 formed by process 700. By way of illustration and not limitation, component blocks 714 may each have a respective cross-sectional profile which forms an irregular pentagonal shape.

As illustrated in stage 720 of process 700, mounting frame 712 and the positioned component blocks 714 may be placed in an evaporative chamber or other structure for sputtering, evaporative coating or other such processing to apply an optical coating material 722. After application of optical coating material 722, the coated component blocks 732 may be removed from the mounting frame 712, as shown at stage 730. Subsequently, at stage 740, the coated component blocks 732 may be bonded to one another—e.g. in a jig (not shown) and/or with an optical adhesive 742—to build up a body 744 which, for example, includes some or all of the features of body 320. An isometric view of such build-up operations is also illustrated in FIG. 7.

Figure 8:
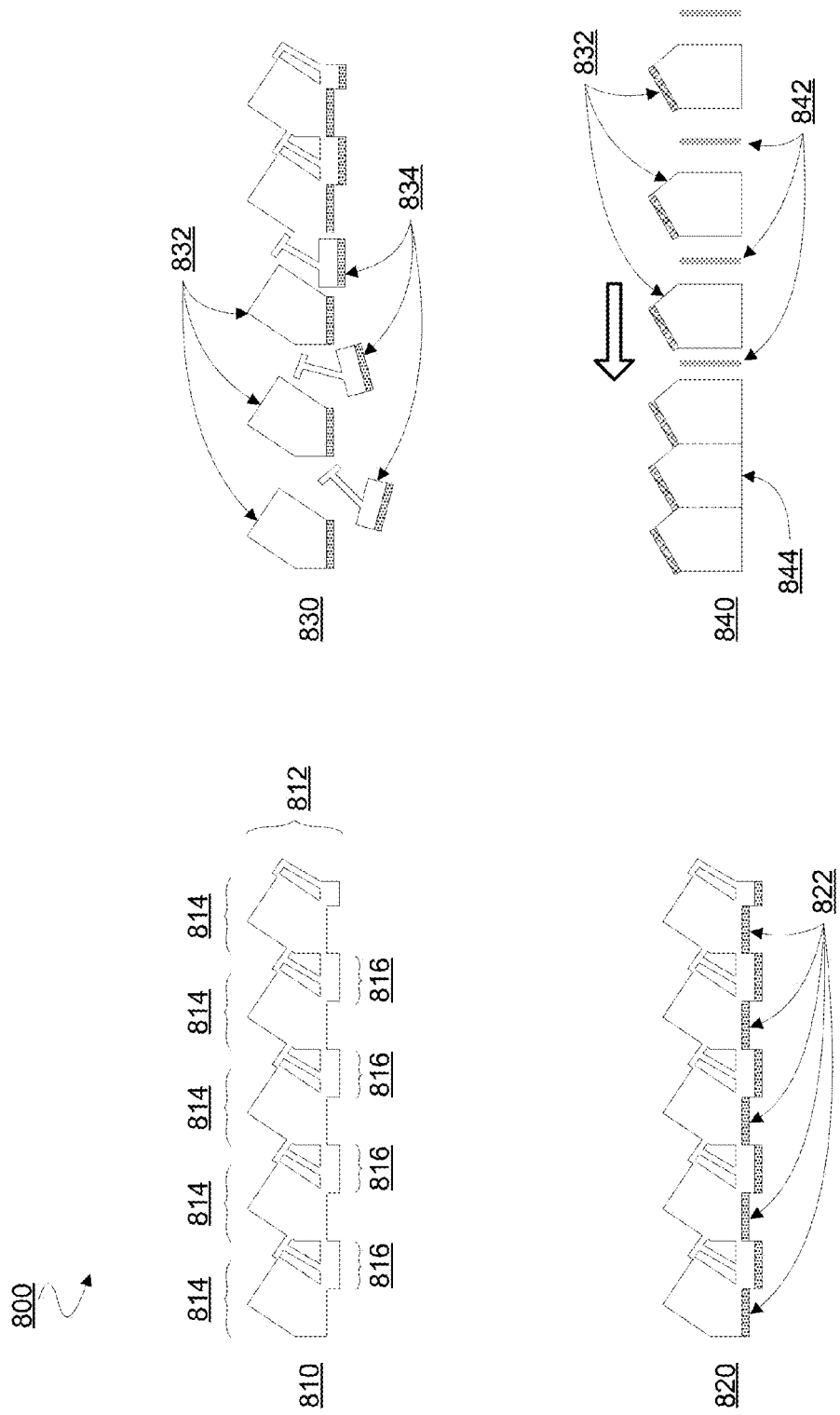
FIG. 8 illustrates elements of a process for fabricating a lightguide assembly according to an embodiment.

FIG. 8 illustrates features of a process 800 according to still another embodiment to implement the applying at 510. Process 800 includes a stage 810 wherein a component framework 812 includes block portions 814 and support portions 816 variously formed between block portions 814. In an embodiment, component framework 812 is injection molded, extruded, cut and/or otherwise formed from a light transmissive material such as that of body 320, for example. The block portions 814 may each include one or more sides which are each to subsequently form a respective facet of a body 844 formed by process 800. By way of illustration and not limitation, block portions 814 may each have a respective cross-sectional profile which conforms to an irregular pentagonal shape.

As illustrated in stage 820 of process 800, component framework 812 may be placed in an evaporative chamber or other structure for sputtering, evaporative coating or other such processing to apply an optical coating material 822. After application of optical coating material 822, the coated block portions 814 may be removed from mounting frame 812. For example, the block portions 814 may be variously separated from sprues 834 of the mounting frame, which previously comprised support portions 816, to form coated blocks 832. Subsequently, at stage 840, the coated component blocks 832 may be bonded to one another—e.g. with an optical adhesive 842—to build up a body 844 which, for example, includes some or all of the features of body 320. The building of body 844 may be include some or all of the features of processing at stage 740, for example.

Method 500 may further comprise, at 520, bonding a first body for a lightguide assembly to a second body for the lightguide assembly. The first body includes a first light transmissive material which forms a first corrugation comprising the first plurality of facets. For example, the first body may be built up according to techniques of one of processes 700, 800. The second body includes a second light transmissive material which forms a second corrugation. In an embodiment, the plurality of optical coatings applied at 510 are disposed between the first corrugation and the second corrugation after the bonding at 520. For each optical coating of the plurality of optical coatings applied at 510, the optical coating may extend across a surface of a respective one of the first plurality of facets. In an embodiment, only a subset of facets of the first corrugation may have a coating disposed thereon. For example, each of the plurality of optical coatings formed at 510 may, within a cross-section of the lightguide assembly, be separated from another of the plurality of optical coatings.

Although certain embodiments are not limited in this regard, method 500 may further comprise, at 530, providing first light to the lightguide assembly, wherein the first light propagates along a first optical path disposed at least partially between a first surface and a second surface of the lightguide assembly. The providing of such light may be performed, for example, to test performance of the optical device during fabrication and assembly. In an embodiment, the first optical path includes a point of the first surface for reflection of the first light to the second surface.

Figure 9:
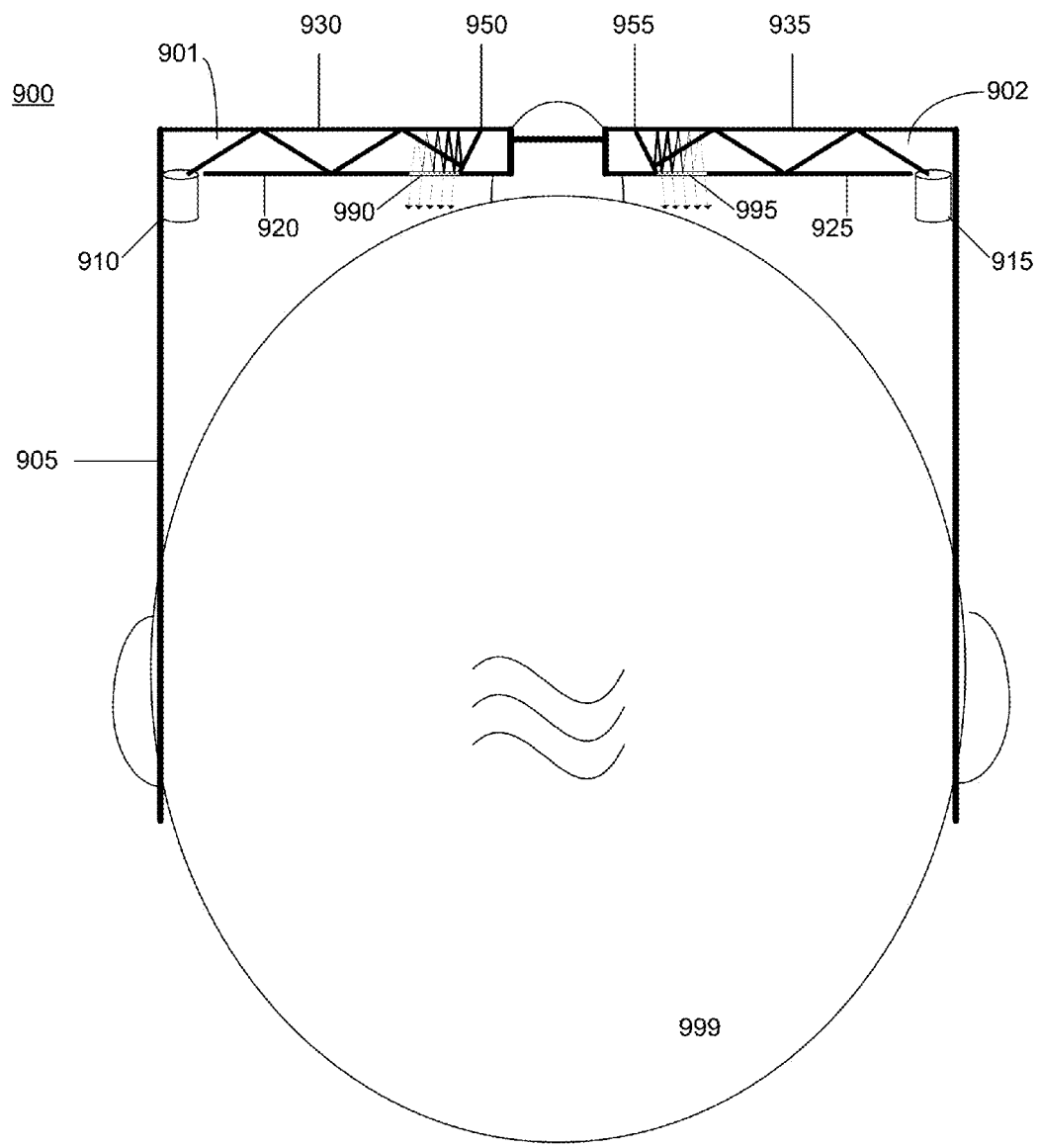
FIG. 9 is a top view of a demonstrative near-to-eye imaging system according to an embodiment.

FIG. 9 is a top view of a demonstrative near-to-eye imaging system 900 in accordance with an embodiment. The illustrated embodiment of imaging system 900 includes two image waveguides 901 and 902, frame 905 including a nose assembly, a left ear assembly, and a right ear assembly, and two image sources 910 and 915.

In this embodiment, image waveguides 901 and 902 are secured into an eye glass arrangement that can be worn on head 999 of a user. The left and right ear assemblies rest over the user's ears while the nose assembly rests over the user's nose. The frame assembly is shaped and sized to position out-coupling regions 990 and 995 of each image lightguide in front of a corresponding eye of the user with the emission surfaces facing the eyes.

Left and right (binocular embodiment) CGIs are generated by image sources 910 and 915, respectively. In one embodiment, image sources 910 and 915 each utilize an independent lamp source and a reflective display (e.g., liquid crystal on silicon ("LCoS")). Of course, other display technologies may be used such as back lit LED displays, quantum dot arrays, organic LED displays, etc. The CGI output by image sources 910 and 915 is launched into their respective image waveguides, 901 and 902, guided through the intermediate regions of said waveguides via reflective parallel surfaces (920 and 930 for lightguide 901, 925 and 935 for lightguide 902), and emitted from out-coupling regions 990 and 995 near to the user's eyes. In other embodiments, a single image source may generate the above described left and right CGIs (e.g., the single image source may be placed near the nose assembly of frame 905, or signals from the single image source may be optically routed to the each of the user's eyes).

Waveguides 901 and 902 propagate light at a shallow angle, as described above. Although certain embodiments are not limited in this regard, the angle of the light may be increased so that it is closer to normal prior to exiting waveguides 901 and 902—e.g. due to reflective end surfaces 950 and 955, respectively. In one embodiment, image waveguides 901 and 902 emit substantially collimated CGI light and therefore virtually project the image at or near infinity. Although the human eye is typically incapable of bringing objects within a few centimeters into focus, since the output light is virtually displayed at or near infinity, the image is readily in focus.

Techniques and architectures for providing an optical device are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A lightguide assembly comprising:
   a first body including a first light transmissive material which forms a first corrugation comprising a first plurality of facets;
   a second body including a second light transmissive material which forms a second corrugation coupled to the first corrugation;

a plurality of optical coatings disposed between the first corrugation and the second corrugation, wherein for each optical coating of the plurality of optical coatings:
the optical coating extends across a surface of a respective one of the first plurality of facets, wherein, within a cross-section of the lightguide assembly, the optical coating is separated from another of the plurality of optical coatings; and
a plurality of polymer coatings disposed between the first body and the second body, wherein for each polymer coating of the plurality of polymer coatings:
the polymer coating extends across a surface of a respective one of the first plurality of facets, wherein, within a cross-section of the lightguide assembly, the polymer coating is separated from another of the plurality of polymer coatings;
wherein the lightguide assembly includes a first surface and a second surface opposing the first surface, the lightguide assembly to receive first light, wherein the first light propagates along a first optical path disposed at least partially between the first surface and the second surface, wherein the first surface to receive and reflect the first light to the second surface, wherein the plurality of optical coatings to pass the first light out of the lightguide assembly through the second surface.

2. The lightguide assembly of claim 1, wherein the first corrugation includes a second plurality of facets alternating with the first plurality of facets along a length of the first corrugation.

3. The lightguide assembly of claim 1, wherein an index of refraction of the polymer coatings is equal to an index of refraction of the first light transmissive material.

4. The lightguide assembly of claim 1, wherein the first body comprises a plurality of component blocks each forming a respective portion of the first corrugation, the plurality of component blocks each coupled to one another with an optical adhesive.

5. The lightguide assembly of claim 1, wherein the first plurality of facets include flat facets.

6. The lightguide assembly of claim 1, wherein a portion of the first corrugation is directly coupled to a portion of the second corrugation.

7. The lightguide assembly of claim 2, wherein the first plurality of facets are each of a first length and the second plurality of facets are each of a second length other than the first length.

8. An optical system comprising:
an image source to generate first light; and
a lightguide assembly including:
a first body including a first light transmissive material which forms a first corrugation comprising a first plurality of facets;
a second body including a second light transmissive material which forms a second corrugation coupled to the first corrugation; and
a plurality of optical coatings disposed between the first corrugation and the second corrugation, wherein for each optical coating of the plurality of optical coatings:
the optical coating extends across a surface of a respective one of the first plurality of facets, wherein, within a cross-section of the lightguide assembly, the optical coating is separated from another of the plurality of optical coatings;
wherein the lightguide assembly includes a first surface and a second surface opposing the first surface, the lightguide assembly to receive the first light, wherein the first light propagates along a first optical path disposed at least partially between the first surface and the second surface, wherein the first surface to receive and reflect the first light to the second surface, wherein the plurality of optical coatings to pass the first light out of the lightguide assembly through the second surface.

9. The optical system of claim 8, wherein the first corrugation includes a second plurality of facets alternating with the first plurality of facets along a length of the first corrugation.

10. The optical system of claim 8, further comprising:
a plurality of polymer coatings disposed between the first body and the second body, wherein for each polymer coating of the plurality of polymer coatings:
the polymer coating extends across a surface of a respective one of the first plurality of facets, wherein, within a cross-section of the lightguide assembly, the polymer coating is separated from another of the plurality of polymer coatings.

11. The optical system of claim 8, wherein the first body comprises a plurality of component blocks each forming a respective portion of the first corrugation, the plurality of component blocks each coupled to one another with an optical adhesive.

12. The optical system of claim 9, wherein the first plurality of facets are each of a first length and the second plurality of facets are each of a second length other than the first length.

13. The optical system of claim 10, wherein an index of refraction of the polymer coatings is equal to an index of refraction of the first light transmissive material.

* * * * *